Sept. 11, 1956 T. M. WRIGHT ET AL 2,762,046

SOCKET INSTALLING APPARATUS

Filed Nov. 23, 1954 4 Sheets-Sheet 1

INVENTORS
THEODORE M. WRIGHT &
ALEXANDER LEON
BY Morris A. Rabkin
ATTORNEY

INVENTORS
THEODORE M. WRIGHT &
ALEXANDER LEON
BY Morris A. Rabkin
ATTORNEY

Sept. 11, 1956 T. M. WRIGHT ET AL 2,762,046

SOCKET INSTALLING APPARATUS

Filed Nov. 23, 1954 4 Sheets-Sheet 3

INVENTORS
THEODORE M. WRIGHT &
ALEXANDER LEON

BY Morris L. Rabkin
ATTORNEY

Sept. 11, 1956 T. M. WRIGHT ET AL 2,762,046

SOCKET INSTALLING APPARATUS

Filed Nov. 23, 1954 4 Sheets-Sheet 4

INVENTORS
THEODORE M. WRIGHT &
ALEXANDER LEON
BY Morris A. Rabkin
ATTORNEY 2,762,046

SOCKET INSTALLING APPARATUS

Theodore M. Wright, Camden, and Alexander Leon, Gloucester, N. J., assignors to Radio Corporation of America, a corporation of Delaware Application November 23, 1954, Serial No. 470,612

15 Claims. (Cl. 1—2)

This invention relates to tube socket installing apparatus, and more particularly to a head and associated apparatus for installing and securing tube sockets or similar components to a printed circuit board.

In the development of electronic apparatus in recent years, increasing attention has been given to the arrangement, size and adaptability to mass production methods of such apparatus. The development of printed circuitry is concerned with this trend and the purpose of the present invention is to provide a machine for assembling tube sockets or similar components having radially extending terminals or lugs to a printed circuit board which has prepunched holes for the reception of these terminals.

An object to the present invention is to provide an improved and efficient apparatus for fastening articles, such as tube sockets, to a printed circuit board.

Another object of the present invention is to provide an improved apparatus for assembling a terminal equipped tube socket in proper angular relationship with respect to the circuit elements of a printed circuit board.

The present invention is set forth herein, illustratively, in connection with equipment and devices for locating sockets on a printed circuit board. These sockets have connectors or terminals which extend radially from the socket body and are capable of being bent to provide mechanical and electrical connection to the board. Apparatus involving the invention, and to later be described more in detail, comprises a movable device for receiving a tube socket indexed to the proper rotational position. The apparatus is effective automatically to bend the radially extending terminals to a predetermined pattern so that the terminals may be inserted in holes in the circuit board. After insertion, the apparatus operates to bend the terminals to lock them to the board.

The movable device, mentioned above, has a socket receiving member including a form over which the terminals are bent. This member is moved into and out of the path of a movable ram. An operating head is mounted on the ram for forming the terminals over the form. The socket is removed from the receiving member and is carried to an apertured circuit board. The terminals are inserted through the apertures or holes and a clamping assembly causes the terminals to be bent and pressed against the side of the circuit board opposite the socket.

The novel features of the invention, as well as additional objects and advantages thereof will be understood more fully from the following description when read in connection with the accompanying drawings, in which.

Figures 1, 2, 2A:
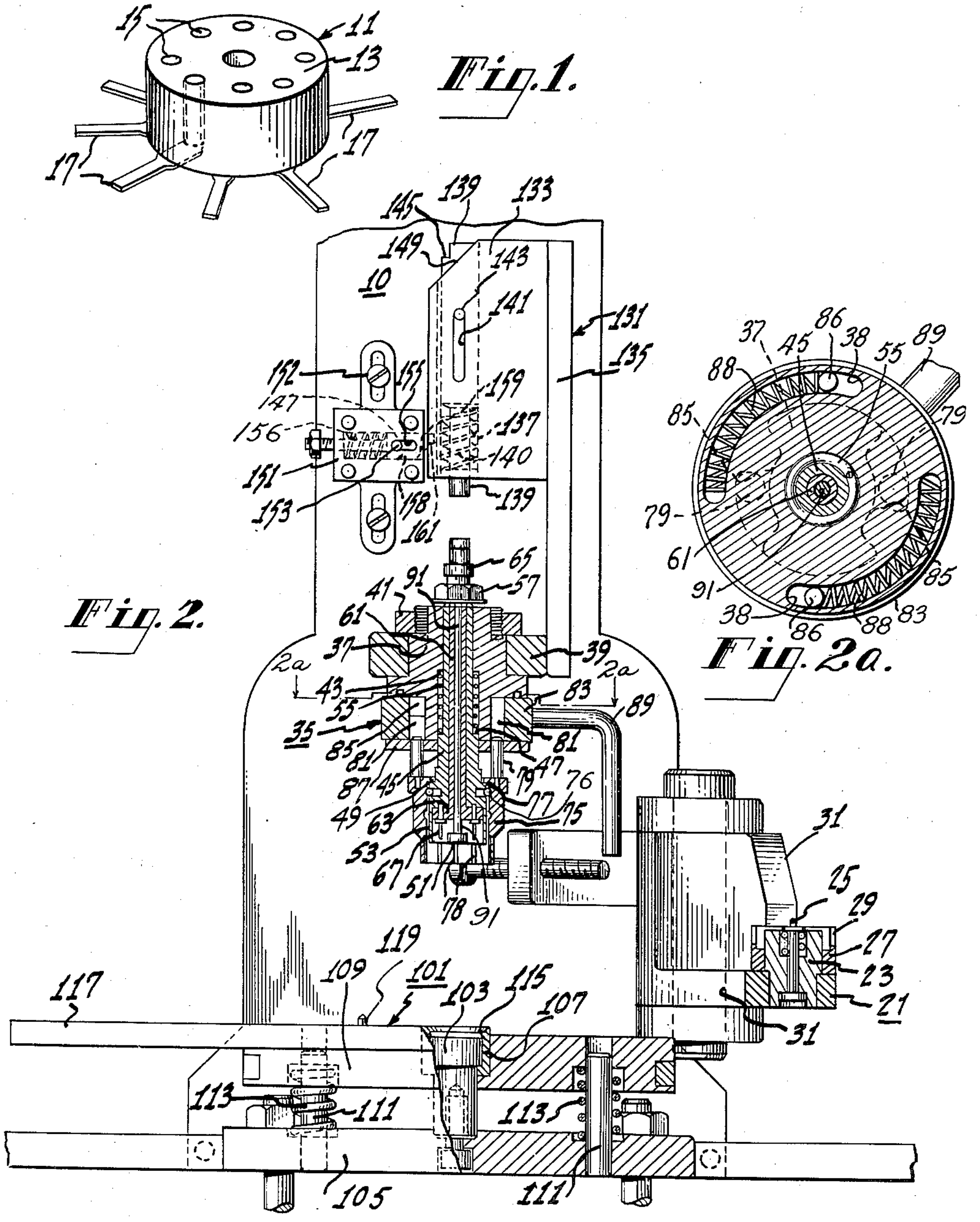
Figure 1 is a perspective view of a tube socket of the type to be handled by apparatus of the present invention.
Figure 2 is a front elevational view partially in section of apparatus according to the present invention.
Figure 3:
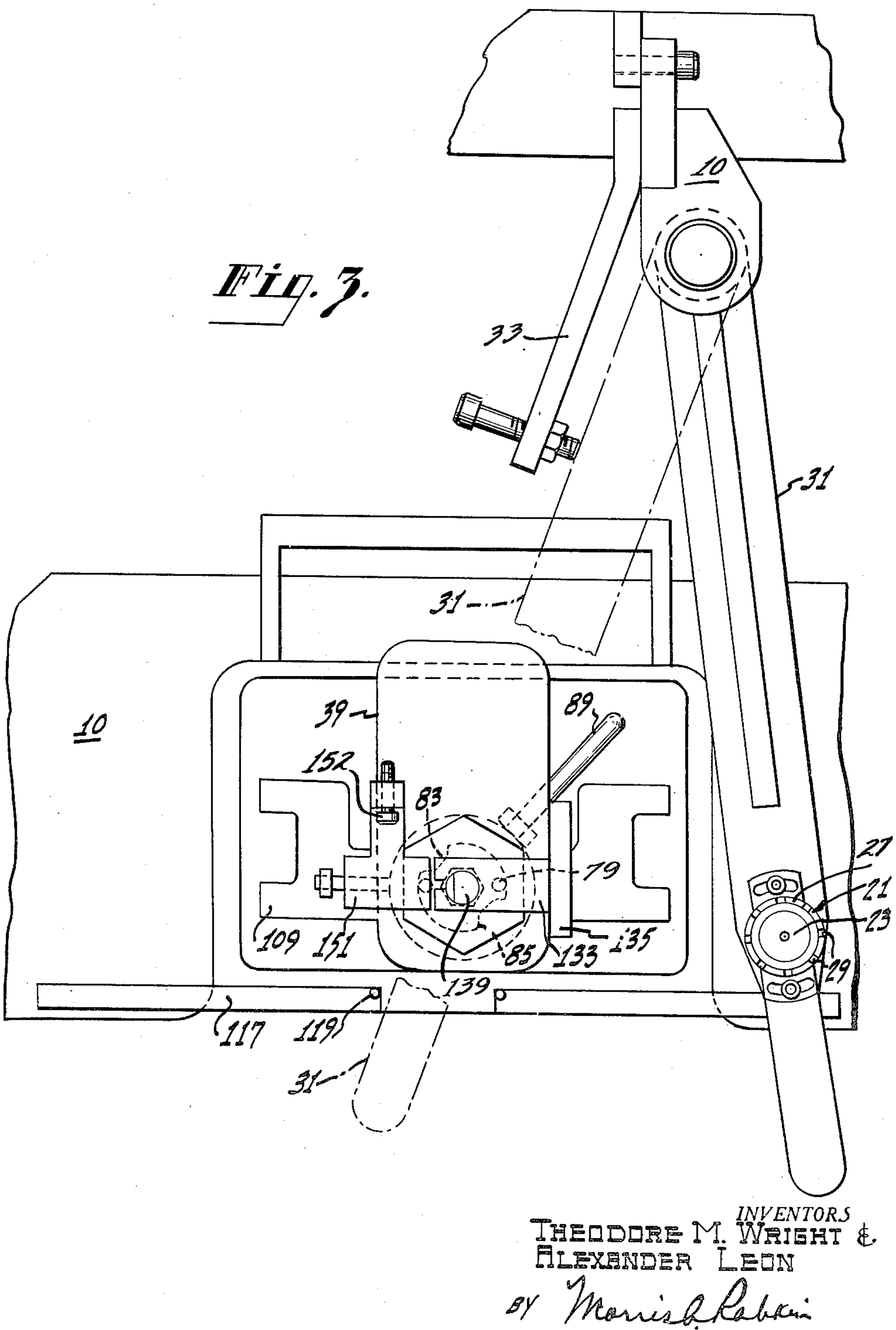

Figure 2*a* is a view in section taken on the line 2*a*—2*a* of Figure 2 looking in the direction of the appended arrows;

Figure 3 is a plan view of the apparatus of Figure 2; and

Figures 4, 5, 6 and 7 are front elevational views similar to Figure 2 illustrating the apparatus in various phases of its operation and including a tube socket illustrated in Figure 1.

Referring in more detail to the accompanying drawings, Figure 1 illustrates a tube socket 11 which may be inserted into a printed board by means of the present apparatus. This socket comprises essentially a flat cylindrical body portion 13 having a plurality of pin sockets 15 located on the upper surface thereof and having a plurality of terminals or solder lugs 17 extending radially therefrom substantially in the plane of the lower surface thereof. Such a socket is adapted to be inserted in a board which has a prearranged hole pattern for receiving the lugs 17 which are then bent underneath the board to clamp the socket thereto. This board might have holes punched, for example, in accordance with any predetermined system of hole location requiring that each of the lugs be bent downwardly at a particular place. While the apparatus is being described for use in conjunction with the above described tube socket, it will be understood that the same procedure and apparatus with slight adaptation may be used for the purpose of assembling other multi-terminal components such as transformers, potentiometers, electrostatic condensers and the like.

The apparatus for assembling a tube socket to a printed circuit board comprises three basic assemblies which are the socket receiving assembly or nest 21; the operating head assembly 35; and a clamping assembly 101, all of which are mounted on a suitable frame 10. The socket receiving assembly 21 includes a cylindrical form or anvil 23 having a centering pin 25 mounted at the center of the upper surface thereof for the purpose of locating the tube socket with respect to the anvil. The configuration of the anvil need not be cylindrical, the prime requisite being that the terminals or solder lugs 17 be bent to coincide with the hole pattern which is provided in the circuit board. The anvil 23 is surrounded by a cylindrical sleeve 27 which is spaced away from the cylindrical surface of the anvil. This sleeve is provided with longitudinal slots 29 which extend downwardly from the top of the sleeve and which are spaced around the sleeve in a manner corresponding to the spacing of the radially extending lugs 17 of the tube socket 11. The upper surface of the sleeve 27 extends slightly above the upper surface of the anvil 23 in order that the lugs 17 will extend through the upper portions of the slots 29 when the socket is resting on the anvil. The spacing of the lugs 17 and slots 29 is such that the socket will only nest in the sleeve in one rotational position. The complete socket receiving assembly 21 is mounted on a pivotally mounted arm 31 in order that the assembly may be moved transversely into and out of the path of the operating head assembly 35. The arm 31 is pivotally secured to a portion of the frame 10. A stop arm 33 determines the position of the arm 31 beneath the operating head assembly 35.

The operating head assembly 35 comprises a body portion 37 which is secured to a movable ram 39 by means of a nut 41. The operating structure for the ram 39 is not illustrated since it does not comprise an essential part of the present invention. The ram will be mounted on the frame 10 and will be movable in a vertical direction either by automatic or by manual means. The body portion 37 is bored to have a region of lesser interior cross section at its upper end separated by a shoulder 43 from a region of greater cross section at its lower end.

A driving member 45 comprises a tubular member having an upper portion of smaller exterior cross section, an intermediate portion of larger exterior cross section, and a lower portion having a still larger external cross section. These portions are separated by an upper shoulder 47 and lower shoulder 49. A recess 51 is provided at the lower end of the driving member to provide a relatively thin walled sleeve portion 53. The upper and intermediate portions of the driving member 45 are dimensioned to fit closely within the body portion 37 in a manner such that the shoulders 43 and 47 will oppose each other. A coil spring 55 is placed within the cavity formed between the adjacent shoulders 43 and 47 and tends to bias the driving member downwardly in relation to the body portion and permits upward movement relative to the body portion. A nut 57 attached to the upper end of the driving member limits the downward movement in relation to the body portion.

A locator rod 61 comprises a tubular member having a flange 63 at its lower end. This rod 61 is dimensioned to be received within the driving member 45 in a manner such that the flange 63 fits into the recess 51 thereof and the top portion of the rod extends beyond the upper end of the driving member 45. This portion is threaded and is secured by a nut 65 to hold the flange 63 tightly against the upper surface of the recess 51. Spaced around the flange 63 and extending downwardly therefrom are a plurality of guide pins or pilot pins 67. These pins are spaced to correspond to the spacing of the pin sockets 15 of the particular tube socket for which the head assembly 35 is designed, and they are caused to engage the tube sockets during operation of the machine. The locator rod 61 may be rotated relative to the driving member, when the nut 65 is loosened, in order that these pins may be oriented in any predetermined position. In the operation of the apparatus, however, the nut 65 is tight and the locator rod and the driving member function as a single element. The pins 67 are surrounded by the thin walled sleeve portion 53 of the driving member 45.

Figure 7:
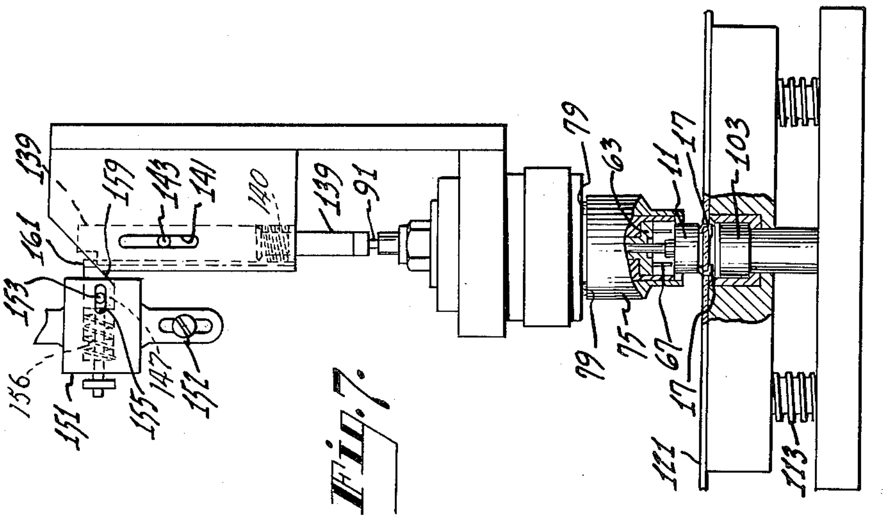

A forming member or sleeve 75 is dimensioned to fit snugly over the lower portion of the driving member 45 and has an inwardly extending flange 77 which engages the lower shoulder 49 of the driving member and thereby limits the downward movement of the forming sleeve in relation to the driving member. The forming sleeve 75 may be indexed in two separate positions relative to the driving member by means of a spring loaded ball and detent arrangement 76. The lower portion of the forming sleeve 75 is dimensioned to be received within the space provided between the forming anvil 23 and the sleeve 27 of the socket receiving assembly 21. The internal surface of the lower portion of the sleeve 75 is provided with longitudinal grooves 78. These grooves extend from the lower end of the sleeve upwardly to a point beyond the lower end of the driving member 45 when the forming sleeve 75 is in its lowermost position. The grooves 78 are spaced to be in radial alignment with the slots 29 and hence are spaced to correspond with the lugs 17 of the socket 11. The function of these grooves will be described subsequently. Referring to Figure 2, the forming sleeve 75 is shown in its lower indexed position. Normally, at the beginning of an operating cycle, this sleeve will be in its upper indexed position as shown in Figure 7. It is shown in Figure 2 in its lower position to illustrate the grooves 78 on the internal surface on the sleeve.

A pair of pins 79 are mounted on the upper surface of the forming sleeve 75 on opposite sides thereof and extend upwardly therefrom. The body portion 37 is provided with recesses 81 permitting the pins 79 to extend upwardly therein. An interference member 83 comprises a ring which surrounds the body portion and which has a pair of diametrically opposed interference lugs 85 which extend radially inwardly. The interference member 83 is mounted to be rotated relative to the body portion 37 and is secured to the body by means of a plate 87. The interference member is normally biased to a position permitting the pins 79 to be fully received within the body portion recess 81. Referring to Figures 2 and 2*a*, the body portion 37 is provided with outwardly extending radial flange. The interference member 83 rides against the under surface of this flange. The flange is provided, on its under surface, with a pair of diametrically opposed arcuate grooves 38 adjacent the outer periphery of the flange. The interference member 83 is provided with a pair of diametrically opposed pins 86 which extend upwardly and are received within the grooves 38. A pair of compression springs 88 are disposed within the grooves 38 and urge the interference member 83, by means of the pins 86, in a clockwise direction to the position indicated in Figure 2*a*. When the interference member is rotated a predetermined amount against the pressure of the springs in a counterclockwise direction, the interference lugs 85 are positioned in the path of the pins 79 so that they may be received only partially within the body portion hence limiting the upward movement of the forming sleeve 75 relative to the body 37.

The interference member 83 is provided with a lever 89. This lever is disposed to be engaged by a ridge on the receiving assembly supporting arm 31 when the receiving assembly is moved into the path of the operating head 35 and hence the interference lugs 83 are placed in the path of the pins 79 when the receiving assembly is in this position.

An ejector rod 91 is contained within the locator rod 61 and is adapted for sliding movement relative thereto. This ejector rod floats freely within the locator rod and has enlarged ends to retain it within the locator rod assembly. The ejector rod is supported by its upper enlarged end, as shown in Figure 2, when a socket is not held in the operating head assembly 35. The function of this rod will be described subsequently.

The clamping assembly 101 comprises a stud 103 rigidly mounted on a fixed base 105 which is fastened to the frame 10 of the apparatus. A support member, or table 109, is mounted for vertical movement with relation to the base 105 and is guided by a pair of pins 111 mounted in the base. A pair of coil springs 113 surrounds the pins 111 to maintain the table 109 in spaced relation above the base 105. A bevel ring 107 is mounted in the table 109 in an aperture positioned directly beneath the operating head 35 and is dimensioned to receive the stud 103. The bevel ring 107 surrounds the upper portion of the stud and fits relatively snugly around this portion of the stud. The bevel ring has a beveled portion 115 on its upper surface biased toward its inner periphery. The external diameter of the bevel 115 corresponds in diameter to the internal diameter of the forming sleeve 75. In its normal position the bevel ring 107 extends somewhat above the upper surface of the stud 103. The flat upper surface of the bevel ring 107 has a sufficient surface area so that the lower surface of the forming sleeve 75 will be directly opposed thereto and will clamp a circuit board 121 between these members when the operating head assembly is caused to engage the clamping assembly.

Mounted on the table 109 are locating bars 117 having locating pins 119. The pins 119 are adapted to be received in pilot holes punched in a circuit board 121 and the bars 117 are adjustable so that the board may be correctly aligned and positioned on the table 109 for the socket fastening operation.

Mounted on the ram 39 is an ejector assembly 131 which acts in cooperation with the ejector rod 91 to hold the socket 11 against the circuit board 121 when the operating head assembly 35 is raised from engagement with the board after the socket has been fastened thereto. The ejector assembly comprises a housing 133 which is mounted over the operating head assembly 35 and attached to the ram 39 by means of a bracket 135. The housing 133 is provided with a vertical aperture 137 which is axially aligned with the ejector rod 91. Disposed within this aperture is an ejector plunger 139 adapted for movement therein. The housing 133 is further provided with a closed slot 141 which extends from the outside of the housing into the aperture 137 and is parallel to the axis of that aperture. This slot 141 is dimensioned to receive a pin 143 which extends transversely from one side of the plunger 139. A movement of the plunger within the ejector housing 133 is therefore limited by this slot and pin arrangement. The plunger 139 is biased upwardly within the housing by means of a compression spring 140 so that the pin 143 will normally be urged against the upper end of the slot 141. The ejector plunger extends out of the housing 133 at the top thereof and the plunger is provided with a shoulder 145 which is adapted to be engaged by a dog 147 to be described. The housing 133 is provided with a cam surface 149 at the point where the plunger extends through its top. The cam surface is angularly disposed with respect to the direction of movement of the housing.

The dog 147 is carried within a housing 151 which is rigidly fixed to the frame 10 of the apparatus by means of bolts 152 and is therefore fixed in relation to the base 105 of the clamping assembly 101. This housing 151 is provided with an aperture in which the dog 147 is disposed to move in a horizontal direction. A transverse pin 153 extending from the dog and a slot 155 in the side of the housing limit the movement of the dog within its housing in the same manner as the ejector plunger movement is limited in its housing. A compression spring 156 is provided within the housing aperture for urging the dog toward the right against the housing 133. The dog 147 has a vertical shoulder 157 which rides against the edge of the ejector housing 133. The dog 147 also has a cam surface 159 which is adapted to be engaged by the cam surface 149 of the ejector housing 133. A longitudinal projection 161, provided on the dog 147, is adapted to engage the shoulder 145 of the ejector plunger. When the ejector housing 133 moves to its lowermost position, it permits the dog 147 to move toward the right and engage the shoulder 145. When the ejector housing is raised, the engagement of the cam surfaces 149 and 159 will cause the dog to be moved to the left to release the ejector plunger for upward movement.

The operation of the apparatus will now be described. Figures 2 and 3 illustrate the apparatus in what will be defined as the rest position with the exception of the forming sleeve 75 which should be in its upper indexed position as stated above. In this upper position, the lower edge of the forming sleeve 75 lies adjacent the lower edge of the sleeve portion 53 of the driving member 45. It will be seen that the operating head assembly 35 is aligned over the clamping assembly 101 and the socket receiving assembly 21, carried on a pivoted arm 31, is positioned out of alignment with the operating head assembly and the clamping assembly. The socket receiving assembly 21 is now in position to receive a tube socket either manually or by an automatic feed means. When a socket has been placed on the forming anvil 23, the arm 31 is swung to the left to move the socket receiving assembly into alignment with the operating head assembly 35. This position of the arm 31 is determined by the stop arm 33. By this movement the arm 31 engages the lever 89 causing the interference member 83 to be rotated to place the interference lugs 85 of the interference member in a position where they will restrict the movement of the pins 79 in an upward direction. This position of the arm 31 is illustrated in phantom in Figure 3.

As the operating head assembly 35 is now moved downwardly by the ram 39, the forming sleeve 75 is in its upper indexed position relative to the driving member 45. The body of the socket 11 will be received within a recess 51 of the driving member 45 and the guide pins 67 will be inserted within the pin sockets 15 to hold the socket rigidly during this operation. When the driving member 45 engages the top of the socket 11 it will recede upwardly within the body portion 37 in order to prevent crushing of the socket and to permit the forming sleeve 75 to move downwardly to engage the lugs 17. Since the forming sleeve 75 is restrained from moving upwardly by the interference lugs 85, it continues to move downwardly within the receiving assembly 21 to complete the operation of bending and forming the lugs 17 over the forming anvil. The forming sleeve 75 is now in its lower indexed position relative to the driving member 45.

Figures 4, 5:
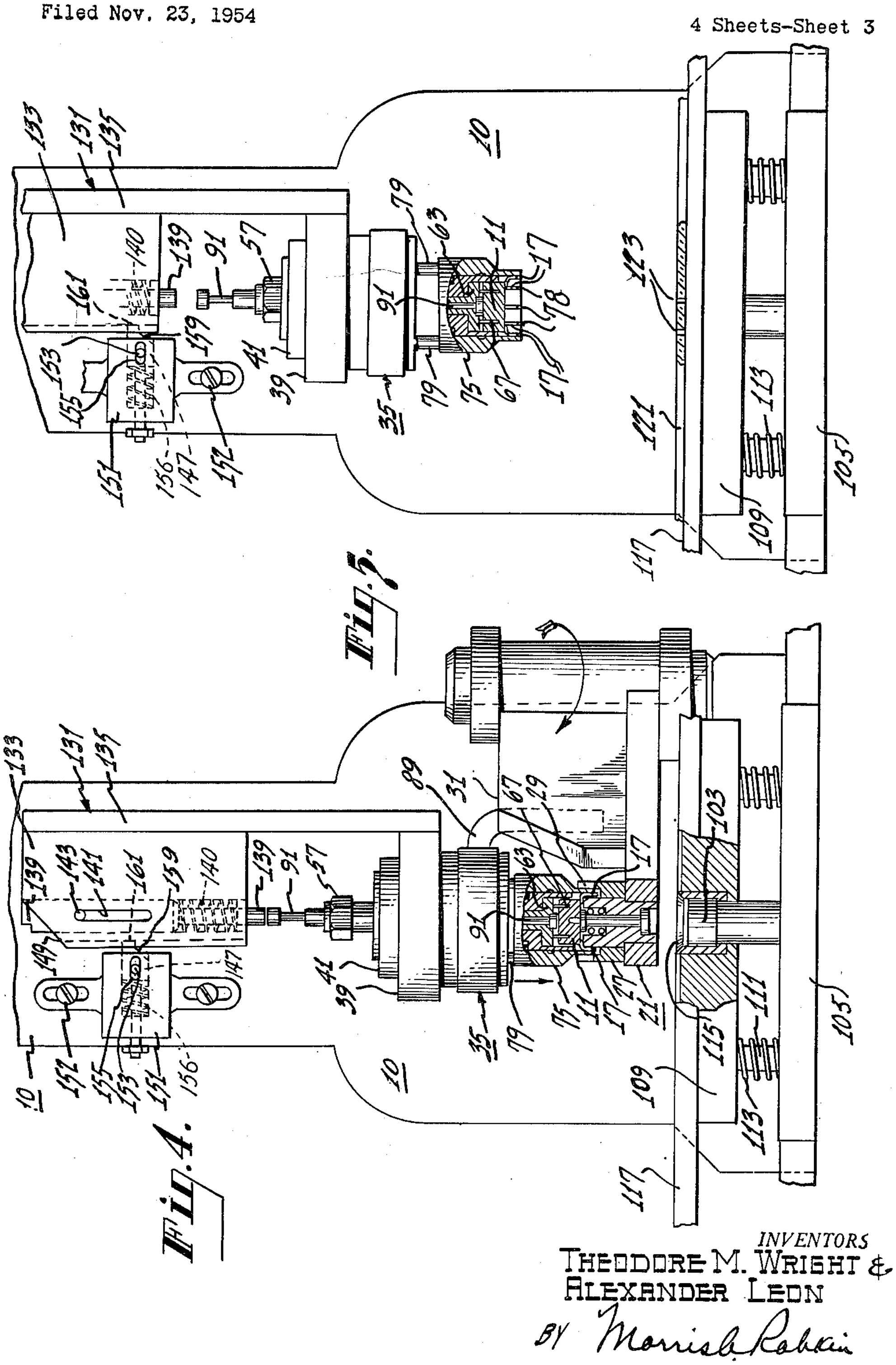

As the solder lugs 17 are bent downwardly by the forming sleeve 75, the bent portions of the lug are contained within the grooves 78 of the forming sleeve. By means of these grooves 78, the bent-over portions of the lugs 17 are aligned and held in a position parallel to the direction of movement of the operating head assembly. This phase is illustrated in Figure 4.

When the operating head assembly is raised from engagement with the socket receiving assembly 21, the socket 11 is retained within the recess 51 by means of the pins 67 and by means of the frictional engagement of the lugs 17 by the sleeve 75. An important feature of the apparatus is that the bent-over portions of the lugs 17 are held in the grooves 78 and are thereby maintained in proper alignment to be accurately placed within the apertures of the circuit board 121. After the operating head assembly is raised, the receiving assembly 21 is moved out of the path of the operating head assembly permitting the interference member 83 to be rotated back to its original position thereby removing the interference lugs 85 from the path of the pins 73. This phase is illustrated in Figure 5.

During the above described operation a printed circuit board 121 is placed on the table 109. This board 121 is provided with spaced apertures 123 which have been prearranged to receive the solder lugs 17 of the socket 11. The board 121 is so placed on the support member that the apertures 123 are aligned over the bevel ring 107. As the operating head assembly 35 is now lowered toward the clamping assembly 101, the lugs 17 are guided into the apertures 123 by the forming sleeve 75. It will be noted that the table 109 supports the board in spaced relation from the top surface of the stud 103. This space permits the lugs 17 to be deflected inwardly toward the socket axis as they are pushed through the apertures 123 and against the beveled portion 115 of the bevel ring 107. As the lugs are forced through the board by the driving member 45, the forming sleeve 75 has its motion retarded by the board and therefore slides upwardly in relation to the driving member 45. The forming sleeve 75 is now held in its upper indexed position by the ball and detent mechanism and is maintained in this position until it is again engaged with the socket receiving assembly 21.

Figure 6:
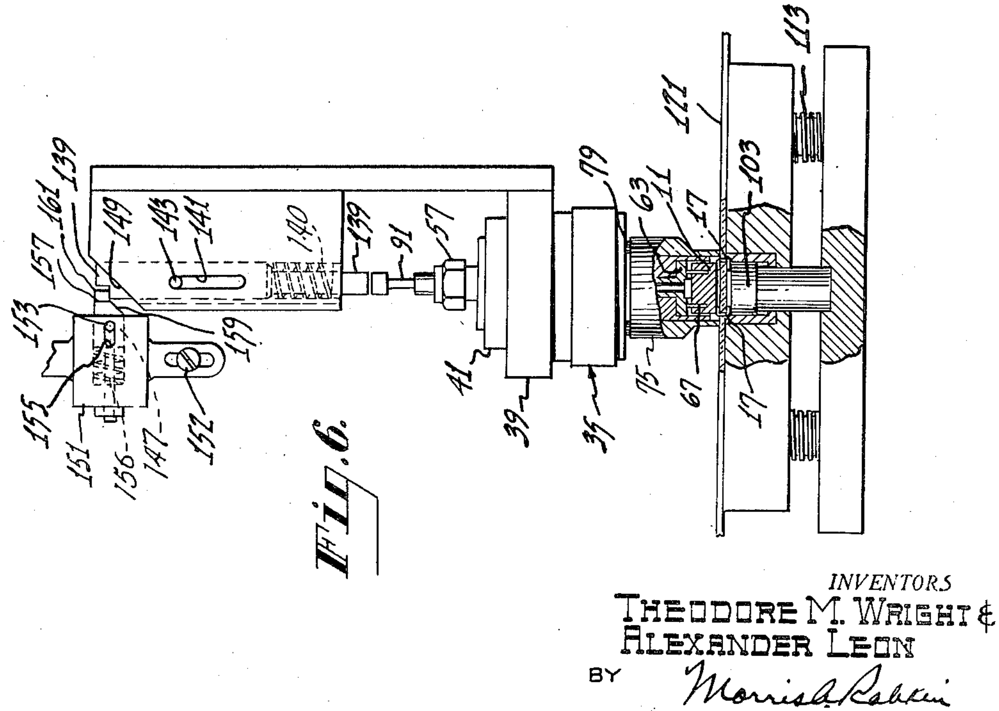

As the driving member 45 continues to move downwardly, the circuit board 121 and its supporting table 109 move downwardly relative to the stud 103 until the lower surface of the circuit board comes into contact with stud 103. By this operation the stud 103 bends the lugs 17 against the lower surface of the board to tightly fix the socket 11 to the board. The limit for the movement of the ram is set so that the operating head will attempt to move the socket and board in a downward direction further than the stud 103 will permit. This can be done without damage to the socket or board because the driving member 45 will again recede upwardly into the body portion 37 against the force of the spring 55. This additional movement of the ram is also desirable for the proper functioning of the ejector mechanism as will be seen. Figure 6 illustrates this phase of the operation.

The height of the dog 147 from the base 105 is fixed so that the distance between the dog projection 161 and the top of the table 109 is equal to the length of the ejector plunger 139 between its lower end and the shoulder 145; plus the length of the ejector rod 91, and plus the width of a circuit board 121 and a tube socket 11. At the rest position there is normally a gap between the ejector plunger 139 and ejector rod 91 in order to permit the driving member 45 to recede into the body portion 37 as illustrated in Figures 4 and 6. As the operating head assembly 35 is moved downwardly during the last described operation, this gap is maintained up to the point where the circuit board engages the stud 103 and the driving member 45 recedes into the body portion 37. During this time the dog 147 is prevented from engagement with the shoulder 145 of the ejector plunger 139. As the operating head is moved further in a downward direction, the driving member 45 and the ejector rod 91 are held against further movement while the ejector plunger is carried downwardly to partially close the gap between the rod and plunger and to permit the dog projection 161 to engage the shoulder 145. As the ram is now raised to remove the operating head 35 from engagement with the socket, the dog 147 only permits the ejector plunger 139 to rise to a point where it will maintain the ejector rod 91 in engagement with the top of the socket 11 when the circuit board 121 and support table 109 return to the rest position. As the ram moves further upward, the housing 133 is carried upwardly relative to the ejector plunger 139 and the operating head 35 is carried upwardly relative to the ejector rod 91. This causes the driving member 45 and the guide pins 67 to be withdrawn from engagement with the socket 11 while the ejector rod holds the socket against the board 121. When the ram has moved the operating head a predetermined distance which is sufficient to clear the socket, the cam surface 149 of the ejector housing 133 engages the cam surface 159 of the dog 147 causing the dog to move toward the left thereby disengaging the dog projection 161 from the shoulder 145 of the ejector plunger. This permits the ejector plunger to again return to its rest position in response to its biasing means and the ejector rod 91 is released from engagement with the top of the socket permitting the circuit board 121 with a socket attached thereto to be removed from the support member 109 and a succeeding board put in its place for the next cycle of operation. This last phase of the operation is illustrated in Figure 7 at the instant that the dog is about to be moved off the plunger shoulder by the action of the cam surfaces of the plunger housing and of the dog.

What is claimed is:

1. Apparatus for fastening a component having radially extending lugs to a panel provided with holes for receiving said lugs, said apparatus comprising a frame, a member pivotally mounted on said frame for receiving said component, means in said member providing a form over which said lugs may be bent, a ram movable with respect to said frame, said receiving member being movable into and out of the path of said ram, a sleeve member associated with said ram for bending said lugs over said form, means associated with said ram for gripping said component, and supporting means for said panel mounted on said frame in the path of said ram, said ram being adapted to carry said component to said supporting means.

2. Apparatus for fastening a component including radially extending lugs to a panel provided with holes for receiving said lugs, said apparatus comprising a frame, a member pivotally mounted on said frame for receiving said component, means in said member providing a form over which said lugs may be bent, a ram vertically movable relative to said frame, a component carrying member associated with said ram, a forming sleeve associated with said component carrying member for bending said lugs over said form and for engaging said lugs, said receiving member being movable into and out of the path of said ram, and supporting means for said panel disposed on said frame beneath said component carrying member, said component carrying member being adapted to carry said component to said panel and to insert said lugs into said holes.

3. The apparatus as defined in claim 2 including, in combination, means for disengaging said component carrying member from said component held thereby, said means holding said component against said panel while said component carrying member is disengaged from said component.

4. Apparatus for fastening a component including radially extending lugs to a panel provided with holes for receiving said lugs, said apparatus comprising a frame, a member pivotally mounted on said frame for receiving said component, means in said member providing a form over which said lugs may be bent, a slotted sleeve surrounding said form for positioning said component over said form, a ram movable vertically relative to said frame, said receiving member being movable horizontally into and out of the path of said ram, a component carrying member associated with said ram, a forming sleeve associated with said component carrying member for bending said lugs over said form, said forming sleeve having internal grooves for engaging said lugs, supporting means for said panel mounted on said frame, said supporting means including beveled means aligned beneath said ram for deflecting said terminal lugs inwardly, means associated with said panel supporting means for aligning said panel to position said holes over said beveled means, said component lugs being guided into said holes by said forming sleeve, and means for clamping said lugs against said panel.

5. The apparatus as defined in claim 4 including, in combination, means for disengaging said component carrying member from said component held thereby, said means holding said component against said panel while said component carrying member disengages from said component.

6. Apparatus for fastening a tube socket having radially extending lugs to a circuit board provided with prearranged holes for receiving said lugs, said apparatus comprising a fixed frame, an arm providing a nest for receiving a socket, a sleeve having radially spaced longitudinal slots for orienting said socket in said nest, means defining a form over which the socket lugs may be bent downwardly substantially at a right angle, a ram adapted for movement in a vertical direction in relation to said frame, a head rigidly fixed to said ram, a driving member slidably mounted in said head, means biasing said driving member to its lowermost position relative to said head, a forming sleeve slidably mounted on said driving member, means associated with said head for selectively limiting the upward movement of said forming sleeve relative to said head, said arm being pivotally mounted on said frame for lateral movement relative thereto, said receiving nest being movable into and out of the path of said head upon pivotal movement of said arm, said driving member having a recessed end portion for receiving said tube socket from said nest, pilot pins associated with said driving member within said recessed end for engaging said tube socket, means for supporting a circuit board beneath said driving member, said means comprising a table mounted to be movable vertically in relation to said frame, a ring mounted in said table and aligned directly beneath said driving member, said ring being beveled inwardly whereby said lugs are deflected inwardly as they are forced through the holes in said circuit boards by said driving member, a stud fixed to said frame and disposed to be engaged by said panel and said deflected lugs whereby said lugs are set against said panel.

7. In a machine for fastening a component having radially extending lugs to a panel provided with apertures for receiving said lugs, a receiving member for said component, a forming anvil in said receiving member having an upper surface adapted for engagement with the lower surface of said component and said radially extending lugs thereof, means for retaining said component in a predetermined rotational position in said receiving member, a driving member mounted on a vertically movable ram, said receiving member being movable into and out of the path of said driving member, a forming sleeve associated with said driving member dimensioned to enclose said forming anvil whereby said lugs are bent downwardly over said anvil, and means in said driving member for retaining said component whereby said component is removed from said receiving member.

8. In a machine for fastening a tube socket having radially extending lugs to a panel provided with prearranged apertures for receiving said lugs, means providing a receiving nest for said socket, a forming anvil in said receiving nest having a flat upper surface adapted for engagement with the lower surface of said socket and said radially extending lugs thereof, a sleeve surrounding said forming anvil in spaced relation thereto, said sleeve extending upwardly above the surface of said forming anvil and having radially spaced slots extending downwardly from the top thereof and adapted to receive said radially extending lugs, a vertically movable ram, a driving member mounted on said ram, said receiving nest being movable into and out of the path of said driving member, a forming sleeve associated with said driving member dimensioned to fit between said forming anvil and said sleeve having radially spaced slots whereby said lugs are bent downwardly over said anvil, and means in said driving member for retaining said socket in position to fasten it to a circuit board.

9. In a machine for fastening a tube socket having radially extending spaced lugs to a printed circuit board provided with prearranged apertures for said lugs, means providing a receiving nest for said socket, a forming anvil in said receiving nest having a flat upper surface adapted for engagement with the lower surface of said socket and said radially extending lugs thereof, said forming anvil having a predetermined contour whereby said lugs are bent to form a predetermined lug pattern, a sleeve surrounding said forming anvil in spaced relation thereto, said sleeve having radially spaced longitudinal slots adapted to receive said radially spaced lugs, a vertically movable ram, a driving head mounted on said ram, said receiving nest being movable into and out of the path of said head, said driving head having a forming sleeve dimensioned to fit between said forming anvil and said slotted sleeve, said forming sleeve having a contour corresponding to the contour of said forming anvil whereby said lugs are bent downwardly over said anvil, said forming sleeve further having longitudinal and radially spaced grooves on its inner surface, said grooves being adapted to align and retain the bent portions of said lugs.

10. In a machine for fastening a component having radially extending lugs to a panel provided with holes for receiving said lugs, a pivotally mounted component receiving member including a forming anvil, a vertically movable ram, a component carrying head mounted on said ram, said receiving member being movable into and out of the path of said head, a driving member in said head mounted for movement in a vertical direction relative to said head, means biasing said driving member to its lowermost position relative to said head, means disposed at the lower end of said driving member for receiving a component, a sleeve mounted for vertical movement on said driving member, said sleeve being dimensioned to form said lugs over said anvil, means associated with said head for limiting the upward movement of said sleeve relative thereto whereby said sleeve is forced over said anvil, when said head is engaged with said receiving member, means for supporting a panel beneath said head, and means associated with said support means for clamping said lugs against said panel when said lugs are driven through the holes provided therefor.

11. In a machine for fastening a socket having radially extending solder lugs to a printed circuit board provided with holes for receiving said lugs, a pivotally mounted socket receiving member including a forming anvil, a vertically movable ram, a socket carrying head mounted on said ram, said socket receiving member being movable into and out of the path of said head, a driving member carried in said head being movable in a vertical direction relative to said head, means biasing said driving member to its lowermost position in said head, means including guide pins associated with said driving member at its lower end for engaging and retaining a tube socket, a sleeve mounted for sliding movement on said driving member, said sleeve being adapted to encompass said forming anvil to bend said lugs downwardly over said anvil, an interference member rotatably mounted on said head for selectively limiting the upward movement of said sleeve relative thereto whereby said sleeve may be forced over said anvil, said sleeve being provided with internal longitudinal grooves for retaining said bent over portions of said lugs whereby said lugs may be guided to said holes in said printed circuit board when said socket carrying head approaches said board, means for supporting said circuit board beneath said socket carrying head, and means associated with said support means for causing said lugs to be clamped against said board when said lugs extend through the holes provided therefor.

12. In a machine for fastening a socket having radially extending lugs to a board provided with apertures for receiving said lugs, a socket receiving member, a forming anvil in said socket receiving member, a movable arm upon which said receiving member is mounted, a vertically movable ram, a socket carrying head mounted on said ram, a forming sleeve slidably mounted for vertical movement at the lower end of said socket carrying head adapted to bend said lugs over said forming anvil, at least one vertical extension extending upwardly from said forming sleeve, a member rotatably mounted on said socket carrying head having at least one radially extending interference lug, and a lever fixed to said rotatably mounted member whereby said interference lug is rotated into the path of said vertical extension to restrict the upward movement of said forming sleeve relative to said socket carrying head, said lever being disposed to be engaged by said movable arm.

13. In a machine for fastening a tube socket having radially extending solder lugs to a printed circuit board provided with apertures for receiving said lugs, a frame, a pivotally mounted socket receiving member, a forming anvil mounted on said socket receiving member, a vertically movable ram, a socket carrying head mounted on said ram, said socket receiving member being movable into and out of the path of said head, a forming sleeve slidably mounted on said head, said sleeve being dimensioned to encompass said forming anvil to bend said lugs downwardly over said forming anvil and to enclose said bent over lugs, a support for said circuit board mounted to be vertically movable relative to said frame, beveled means in said support aligned beneath said forming sleeve for bending said lugs inwardly toward the axis of said socket, and a member fixed to said frame and extending upwardly within said beveled means whereby said lugs are clamped to said circuit board.

14. In a machine for fastening a tube socket having radially extending lugs to a printed circuit board provided with apertures for receiving said lugs, a frame, a pivotally mounted socket receiving member, a forming anvil mounted on said socket receiving member, a vertically movable ram, said socket receiving member being movable into and out of the path of said ram, a socket carrying head mounted on said ram, means associated with said head for bending said lugs downwardly over said anvil and for retaining said socket, a support for said printed circuit board disposed beneath said head, said head being adapted to carry said socket to said board and to drive said lugs through said board, means associated with said support for causing said lugs to be deflected inwardly when said lugs are driven through the apertures in said board, a rod slidably mounted in said socket carrying head engaging the top of said socket in said head, latch means mounted on said frame for engaging said rod when said head engages said socket with said board, and cam means associated with said ram for releasing said latch means when said head is released from engagement with said socket.

15. In a machine for fastening a tube socket having radially extending lugs to a printed circuit board provided with apertures for receiving said lugs, a frame, a pivotally mounted socket receiving member, a forming anvil mounted on said socket receiving member, a vertically movable ram, said socket receiving member being movable into and out of the path of said ram, a socket carrying head mounted on said ram, means associated with said head for bending said lugs downwardly over said anvil and for retaining said socket, a support disposed beneath said head for said printed circuit board, said head being adapted to carry said socket to said board and to drive said lugs through said board, means associated with said support for causing said lugs to be deflected inwardly toward the axis of said socket when said lugs are driven through said apertures in said boards, a rod slidably mounted in said socket carrying head adapted to engage the top of said socket carried in said head, a housing mounted on said ram, a vertically movable plunger carried in said housing and aligned above said rod, means biasing said plunger to its uppermost position with respect to said housing, a dog mounted on said frame and disposed for lateral movement with respect to said plunger means biasing said dog against said plunger housing, said plunger being engaged by said dog when said socket carrying head engages said socket with said board, said engagement of said dog and said plunger being maintained as said head is raised from said board, and cam means on said housing for causing said dog to disengage from said plunger.

References Cited in the file of this patent

UNITED STATES PATENTS

| | | |
|---|---|---|
| 447,314 | Grunich | Mar. 3, 1891 |
| 572,293 | Greenfield | Dec. 1, 1896 |
| 1,268,355 | Jackson | June 4, 1918 |
| 1,846,007 | Levine | Feb. 16, 1932 |
| 2,417,817 | Finn | Mar. 25, 1947 |